INVENTOR
EUGENE JOEL RIVOCHE

BY Bacon & Thomas
ATTORNEYS

United States Patent Office 2,786,763
Patented Mar. 26, 1957

2,786,763
FOOD PROCESS
Eugene Joel Rivoche, Washington, D. C.
Application January 6, 1953, Serial No. 329,795
5 Claims. (Cl. 99—131)

This invention relates to a process of producing food products through the use of a passenger gel. More particularly, the invention relates to a process of producing foods which are cooked in a hot liquid bath, such as a fat bath, through the use of a passenger gel which forms a heat resistant food structure and substantially disappears during the cooking step, this application being a continuation-in-part of my application, Serial No. 307,217, filed August 30, 1952. In my aforementioned application, there were described several processes for producing numerous types of food products wherein a firm, rigid structure was formed through the use of an advanced gel or coagulum which was subsequently fried, cooked or baked to form the finished food product, the gel, as a gel, disappearing in the cooking step. The present application relates to a similar process wherein the advanced gel is formed through the use of a soluble salt of an edible alkaline earth metal which brings about the jellification in a controlled manner. Such control is achieved through the proper regulation of temperature, the type of salt, or through the use of buffering agents.

It is an object of this invention to produce food products through a novel process utilizing a passenger gel wherein the passenger gel is formed through the agency of soluble salts of edible alkaline earth metals.

It is a further object of this invention to produce food products through the use of a novel passenger gel process wherein jellification is brought about in a controlled manner through the agency of a soluble salt of an edible alkaline earth metal acting in conjunction with a buffering agent.

It is a still further object of this invention to produce food products by means of the foregoing processes wherein the processes are carried out on a continuous basis.

Figure 1:
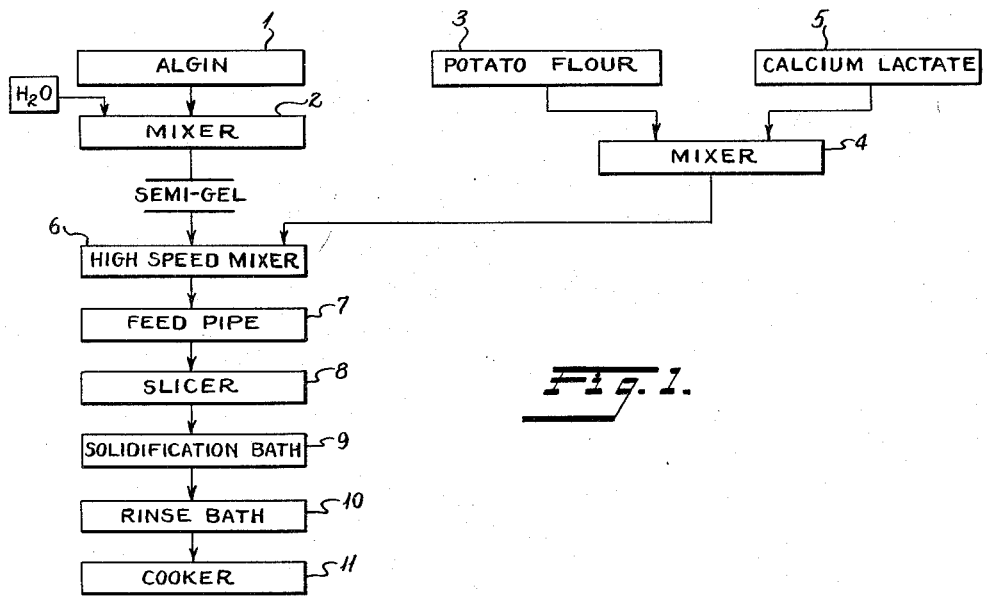
Figure 2:
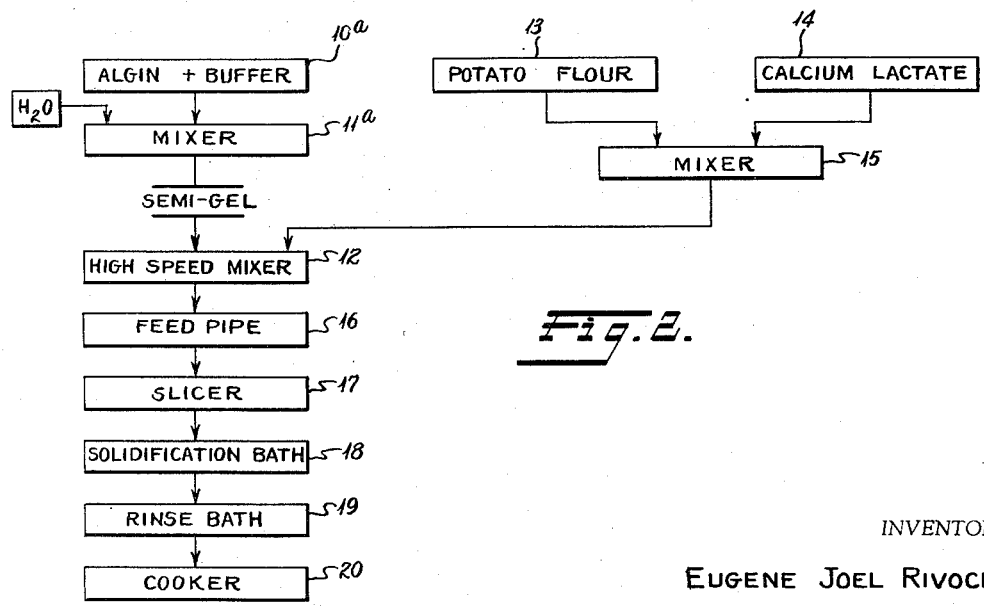

Further objects and advantages of this invention will become apparent upon reference to the following specification and drawings, wherein Figure 1 is a flow diagram of one embodiment of the invention, and Figure 2 is a flow diagram of a second embodiment of the invention.

Referring more particularly to Figure 1, a colloid 1, such as an algin, is mixed in a mixer 2 with water to form a viscous semi-gel-like substance. Simultaneously, a food powder, such as potato flour 3, is mixed in a dry mixer 4 with a suitable soluble salt of an edible alkaline earth metal, preferably a calcium salt such as calcium lactate 5. After the algin has been thoroughly mixed with the water for a time sufficient to allow hydration of the algin, which time will depend upon the temperature of the water and the speed of mixing, the solution is delivered into a high speed mixer 6 which simultaneously receives the mixed potato flour and calcium lactate from the dry mixer 4. As soon as the calcium lactate is placed in the algin solution, the advanced gelatinization action is instituted and its speed is dependent upon the particular calcium salt used and the temperature of the ingredients. A very high speed mixer is used and the calcium lactate is homogeneously dispersed throughout the potato flour so that a rapid homogeneous dispersion of the calcium lactate throughout the algin solution is obtained. The setting advanced gel is then evacuated from the high speed mixer 6 and fed into a feed pipe or other feed means 7 wherein the final gelatinization occurs. The fully advanced gel is then cut into the desired sizes by means of the slicer 8, is fed to a solidification bath 9 containing a solution of a calcium salt and is rinsed in a water bath 10. The slices are thereafter delivered to a cooker 11.

Although calcium salts are the most desirable from the standpoint of economy and edibility, it is also possible to use other alkaline earth metal salts. In addition to calcium lactate, it is possible to use various calcium salts, such as, for instance, calcium citrate, calcium phosphate, etc. As has been described in my aforementioned copending application, the amount of colloid, such as an algin, which is used will be determined primarily by the viscosity desired in the colloid solution and will normally be above 0.75 gram of algin per 100 grams of water or a corresponding amount of pectins or other colloids. The amount of calcium salts which must be used will in turn be determined by the amount of colloid which it is necessary to transform into an advanced gel, the method of determining the amounts necessary to effect this transformation being well known to those skilled in the art. In addition to the amount of calcium ions necessary to bring about the desired gelatinization, there must be taken into account the solubility of the particular calcium salt used. For instance, it is necessary to use considerably more calcium phosphate than calcium lactate because of the lower solubility of the former. Magnesium salts, such as magnesium carbonate, may be employed as gelation agents when hydrophilic colloids are used which form insoluble magnesium compounds with free magnesium ions. Thus, magnesium salts may be utilized with pectins and pectinates, but cannot be used with alginates.

Because an advanced gel cannot be stirred, extruded or changed in shape in any manner, it is necessary to insure that mixing in the high speed mixer 6 is complete and the material is fed into the feed pipe or other forming means prior to any substantial completion of the advanced gelatization phenomenon. Control of this phenomenon is achieved through control of the temperature of the ingredients in the high speed mixer, the higher temperatures causing more rapid setting up of the advanced gel because of the increase in solubility caused thereby, and the lower temperatures providing more time in which to manipulate the substance. Whereas a wide range of temperatures is satisfactory if the speed of mixing and type of calcium salt is adjusted accordingly, it has been found desirable to operate in the lower temperature ranges, approximately between about 32° F. and room temperatures.

Another factor which may be adjusted to control the speed of formation of the advanced gel is the specific calcium salt which is utilized, some salts dissolving more rapidly than others. By properly selecting the calcium salt to be used and appropriately adjusting the temperature, the speed of formation of the advanced gel can be satisfactorily controlled.

The following is an example of the production of potato chips wherein the speed of advanced gelatinization was controlled by means of temperature adjustment and salt selection:

*Example No. 1.*—Five grams of starch were mixed with one gram of "Kelgin" standard viscosity algin, so that the algin was homogenously dispersed in the starch and this mixture was homogenously dispersed in ninety-nine grams of water, the wet mixing continuing for approximately five minutes. Forty-five grams of potato flour were mixed with 0.15 gram of calcium lactate to form a dry powder which was mixed with the algin solution in a high speed mixer, all mixings being carried out at room temperature. The setting advanced gel in the high speed mixer was quickly evacuated within about ten seconds into a feed pipe where the advanced gel set. This advanced gel was subsequently sliced into thin slices, and the slices dipped in a calcium lactate solidification bath, rinsed and fried in a hot fat bath to form potato chips.

Whereas the flow diagram of Figure 1 shows the algin being mixed directly with the water without the addition of any starch or food powder as disclosed in the above example, this is merely a matter of choice since the use of a food powder with the algin is merely an additional means of securing a homogenous dispersion of the algin in the water, as is described more fully in my aforementioned copending application.

According to the embodiment of the invention shown in Figure 2, a suitable colloid such as an algin is premixed with a suitable buffering agent, such as sodium phosphate, to form a dry mixture 10$^a$ which is fed into a mixer 11$^a$ where it is mixed with water to form an algin solution or semi-gel which is then transferred to a high speed mixer 12. Simultaneously with the mixing of the algin in the water, a food flour, such as potato flour 13, is mixed with a calcium salt, such as calcium lactate 14, in a dry mixer 15 and the mixed food powder is then delivered into a high speed mixer 12 where the formation of an advanced gel is instituted. The forming advanced gel is thence fed into a feed pipe 16 and to a slicer 17, the sliced gel then going to a solidification bath 18, rinse bath 19 and cooker 20. In this embodiment of the invention, the speed of formation of the advanced gel is controlled by the buffering agent, which may be any conventional buffer salt, of which many are well known in the art, and which operates to delay the formation of an advanced gel through a temporary raising of the pH of the colloid solution. Examples of such buffers are sodium phosphate, sodium acetate, trisodium phosphate, etc.

The following are examples of the preparation of potato chips according to the second embodiment of the invention wherein the speed of advanced gelatinization was controlled by means of a buffering agent:

*Example No. 2.*—Five grams of starch were mixed dry with one gram of "Kelgin" low viscosity algin and with 0.5 gram of sodium phosphate, sold commercially as "Calgon." The foregoing mixture of powders was then homogenously dispersed in ninety-nine grams of water by mixing approximately five minutes. Forty-five grams of potato flour were mixed with 0.20 gram of calcium lactate, and this mixture rapidly introduced into a high speed mixer containing the algin, starch, and "Calgon" solution. After a period of approximately ten seconds the forming advanced gel was transferred into a feed pipe from which it was removed after gel formation, sliced, dipped in a calcium lactate solidification bath, dipped in a water rinse bath and fried. All mixing operations were carried out at room temperatures.

*Example No. 3.*—Example No. 2 was repeated, except that 0.15 gram of "Calgon" and 0.25 gram of calcium lactate were used.

The temperature of mixing can be used to control not only the speed of formation of the advanced gel, but can also be used to facilitate the original mixing of food powder in water, as is more fully set out in my aforementioned copending application. In the control of such mixing temperatures, it has been found possible to cool the powdered ingredients themselves in addition to cooling the water, and it has even been found possible to freeze the various powders since they possess a very low moisture content. This cooling or freezing of the powders, particularly the food powders, has been found very helpful in preventing the absorption of any appreciable quantities of water by such food powders during the mixing operations.

Although the illustrated embodiments of the invention have disclosed feeding the food particles and gelation agent to the high speed mixer as dry powders, it is also possible to first disperse these ingredients in water so that the high speed mixer handles two liquids rather than a liquid and a dry powder. In certain instances, this results in savings in equipment costs and may be preferable to the mixing of the dry powders. Thus, the high speed mixer would simultaneously receive first a water colloid solution which may or may not contain food particles and, second, a dispersion of food powders in a solution of a salt of an edible alkaline earth metal such as calcium lactate. In dispersing the food powder in the water solution of the gelation agent, it is necessary to observe the anti-hydration precautions fully set out in my aforementioned copending application and the dispersion is accordingly preferably carried out at low temperatures, that is, at temperatures no higher than approximately room temperature. The feeding of two liquids to the high speed mixer is also possible where the gelation agent is an insoluble rather than a soluble salt of an alkaline earth metal, and in this case, the insoluble salt is dispersed in the water colloid solution and the dispersion of food powder in water also contains an acid to solubilize the insoluble salt.

The pre-mixing of oil or fat in the food products, fully described in my copending application, is also a satisfactory mode of operation with the processes of this invention. According to this facet, oil or fat may be pre-mixed with either the water colloid solution or the food powder—water dispersion, forming an emulsion in either case. This particular step has numerous advantages which are fully set out in my copending application.

While this invention has been described in connection with specific embodiments, this has been done for illustrative purposes only, and is not to be deemed limiting in any sense, the invention being limited only by the scope and spirit of the appended claims.

I claim:

1. In a process for preparing food products wherein a water-colloid solution containing food particles homogeneously dispersed therein is prepared by mixing water with finely-divided solid ingredients including a hydrophilic colloid, an edible salt of an alkaline earth metal, and food particles, the water-colloid solution forming a heat-irreversible advanced gel while the food particles are maintained in their homogeneously-dispersed condition, and said advanced gel and its homogeneously-dispersed food particles are cooked to cause said gel characteristics to substantially disappear, the improvement comprising: cooling at least a portion of said finely-divided solid ingredients to a temperature substantially below room temperature prior to the mixing operation.

2. The process as defined in claim 1, wherein at least a portion of said finely-divided solid ingredients, including the food particles, is frozen prior to the mixing operation.

3. The process as defined in claim 1, wherein said hydrophilic colloid is a water-soluble algin and said edible salt of an alkaline earth metal is a water-soluble calcium salt.

4. The process as defined in claim 3, wherein said water-soluble algin is mixed with a portion of the solid food particles, and said water-soluble calcium salt is mixed with another portion of said solid food particles prior to mixing the finely-divided solid ingredients with the water.

5. The process as defined in claim 1, wherein the finely-divided solid ingredients include an edible buffer salt.

References Cited in the file of this patent

UNITED STATES PATENTS

| | | |
|---|---|---|
| 1,795,980 | Wahl | Mar. 10, 1931 |
| 2,036,922 | Clark et al. | Apr. 7, 1936 |
| 2,168,246 | Shepherd | Aug. 1, 1939 |
| 2,233,574 | Baker et al. | Mar. 4, 1941 |
| 2,334,281 | Olsen et al. | Nov. 16, 1943 |
| 2,373,729 | Willaman | Apr. 17, 1945 |
| 2,403,547 | Peschardt | July 9, 1946 |
| 2,441,729 | Steiner | May 18, 1948 |